May 8, 1934.    A. L. STOWELL    1,958,024
FRICTION SPRING
Filed Jan. 20, 1931
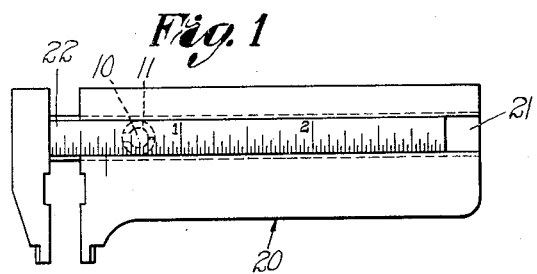
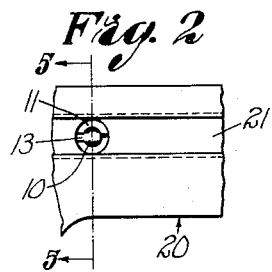
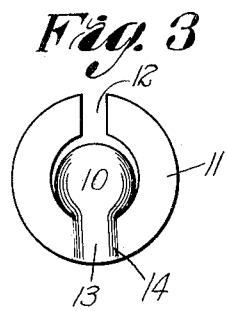
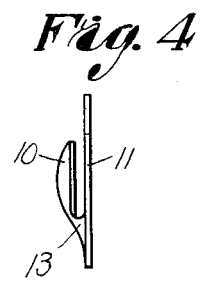
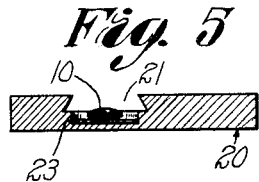
Inventor
Austin L. Stowell
By H. Clay Lindsey.
Attorney Patented May 8, 1934

1,958,024

UNITED STATES PATENT OFFICE 1,958,024

FRICTION SPRING

Austin L. Stowell, New Britain, Conn., assignor to The Stanley Works, New Britain, Conn., a corporation of Connecticut Application January 20, 1931, Serial No. 509,965

6 Claims. (Cl. 33—143)

This invention has to do generally with devices for frictionally holding a pair of relatively slidable members in any desired position of adjustment, and relates more particularly to a friction spring adapted for use in connection with measuring instruments of the type having a slidable member intended to be adjusted and held temporarily in adjusted position, and among which instruments may be mentioned extension rules, calipers, gauges, et cetera.

The aim of the present invention is to provide a friction spring of this character which, while very simple in construction, is characterized by its effectiveness in operation in that it will with ample security frictionally hold the sliding member in any desired position of adjustment.

The frictional spring constructed in accordance with the present invention may be manufactured at a relatively low cost, and may be very quickly and easily applied. It holds itself securely in place, and it serves its purpose with the least possible chance of getting out of order.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown one of the many embodiments which the present invention may take, Fig. 1 is a side elevational view of a caliper rule to which the improvement of the present invention is applied;

Fig. 2 is a partial view of the body portion of the instrument, the slide being removed and the friction spring being illustrated;

Fig. 3 is a face view of the friction spring;

Fig. 4 is a side edge view thereof, and

Fig. 5 is a transverse sectional view taken substantially on the line 5—5 of Fig. 2.

In accordance with the present invention, the friction spring consists of an integral piece of resilient metal, such as spring steel, preferably punched from a sheet and having a dome-shaped central portion and a base comprising a pair of curved spring arms forming, in effect, a split washer, the central portion being raised out of the plane of the washer and being connected to the washer at a point opposite the slit thereof by a narrow neck.

Referring more particularly to the drawings, the improved friction spring has a central portion 10 preferably of generally circular form, and of concavo-convex shape so that it is generally domed or parti-spherical. It also has a base or washer portion comprising a pair of arms 11 surrounding the central portion but spaced slightly from the plane thereof. That is to say, the domed portion is raised above the base or washer portion. The free ends of the arms are separated by a space 12. The central portion is connected to the base portion at a point opposite the free ends by a neck or connection portion 13.

The washer portion as illustrated is generally circular. In order to raise the central dome portion out of the plane of the washer portion, the latter is provided with a radially extending sloping corrugation 14.

In Figs. 1, 2, and 5 I have shown the friction spring applied to a caliper rule, it being understood, however, that this showing is by way of exemplification only, it being obvious that my improved device may be used generally for frictionally holding two relatively sliding members in various adjusted positions.

In the present instance, the caliper rule is shown as having a body portion 20 provided with a longitudinally extending groove 21, the sides of which are undercut, as shown most clearly in Fig. 5. The numeral 22 designates a slide which in cross section corresponds to that of the groove 21 so that it will slidably fit in this groove in the usual manner. In the bottom of the groove 21 is a round or cylindrical pocket or recess 23 of slightly smaller diameter than the washer portion of the friction spring before the latter is inserted in place. To insert the spring in the pocket, the arms 11 are slightly pressed towards each other and the washer is then inserted into the pocket. The arms now spring apart, and the outward pressure of these arms against the side wall of the pocket serves to hold the spring in place with ample security.

When the parts are assembled, as shown in Fig. 1, the friction spring is seated in the pocket and the convex surface of the dome engages the under side of the slide, thereby pressing the slide against the undercut walls of the groove 21. The pressure exerted between the body portion and the slide of the caliper is such as to hold these parts in any desired position of adjustment. The spring also exerts a drag on the slide, and this makes it easier to accurately bring the slide to a predetermined position.

It will be seen from the foregoing description, taken in conjunction with the accompanying drawing, that my improved spring is of a very simple construction, and it may be very economically and quickly manufactured. In fact, it may be manufactured in one or two punching and lancing operations, which operations may be very expediently carried out with inexpensive dies and on standard machines. The operation of applying the friction spring is exceedingly simple. The inherent resiliency of the friction spring is employed to hold the spring in place, separate anchoring means being entirely eliminated. As the friction spring comprises but a single or unitary piece of metal, there is nothing to get out of order. If desirable, the friction spring may be mounted over a short stud, with the arms straddling and gripping the stud.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. A friction spring of the character described for holding a pair of relatively sliding members in adjusted positions and comprising a washer portion having a pair of spring arms, a central portion raised out of the plane of said washer portion, and a connecting portion between the central portion and washer portion.

2. A friction spring of the character described, comprising a dome-shaped central portion, a pair of flat curved arms substantially encircling said central portion, and a neck portion between the central portion and said arms, said central portion being spaced from the plane of said arms.

3. A friction spring of the character described having a circular washer portion comprising a pair of oppositely curved arcuate arms separated at their free ends, a concavo-convex central portion raised out of the plane of the washer portion, and a neck between said central portion and washer portion and located opposite the free ends of said arm.

4. In combination, a pair of relatively sliding members, one of which has an undercut groove in which the other member is slidably mounted, one of the opposed faces of said members having a circular pocket; and a friction spring having a circular washer portion comprising a pair of arms normally of larger diameter than said pocket and adapted to fit in said pocket and adapted to engage the circumferential wall thereof, said friction spring also having a central portion raised out of the plane of said washer portion and adapted to engage the opposed face of the other member, and a neck portion between said central portion and washer portion.

5. A friction spring of the character described for holding a pair of relatively sliding members in adjusted positions and comprising a washer portion having a pair of spring arms, a central portion raised out of the plane of said washer portion, said washer portion having a radially extending corrugation, and a connecting portion between the central portion and said corrugation.

6. In combination, a pair of relatively sliding members, one of which has an undercut groove in which the other member is slidably mounted, one of the opposed faces of said members having a pocket, and spring means seated in said pocket and having a portion resiliently engaging the side walls of said pocket, whereby it is retained by its own resiliency in said pocket, said spring means also having a second portion operable independently of the first portion and resiliently engaging the opposed face of the other member to force said other member into wedging engagement with said groove, the resilient force of the last mentioned portion of said spring means being exerted in a direction substantially at right angles to the direction in which the resilient force of the first mentioned portion of the spring means is exerted.

AUSTIN L. STOWELL.